Patented Apr. 13, 1954

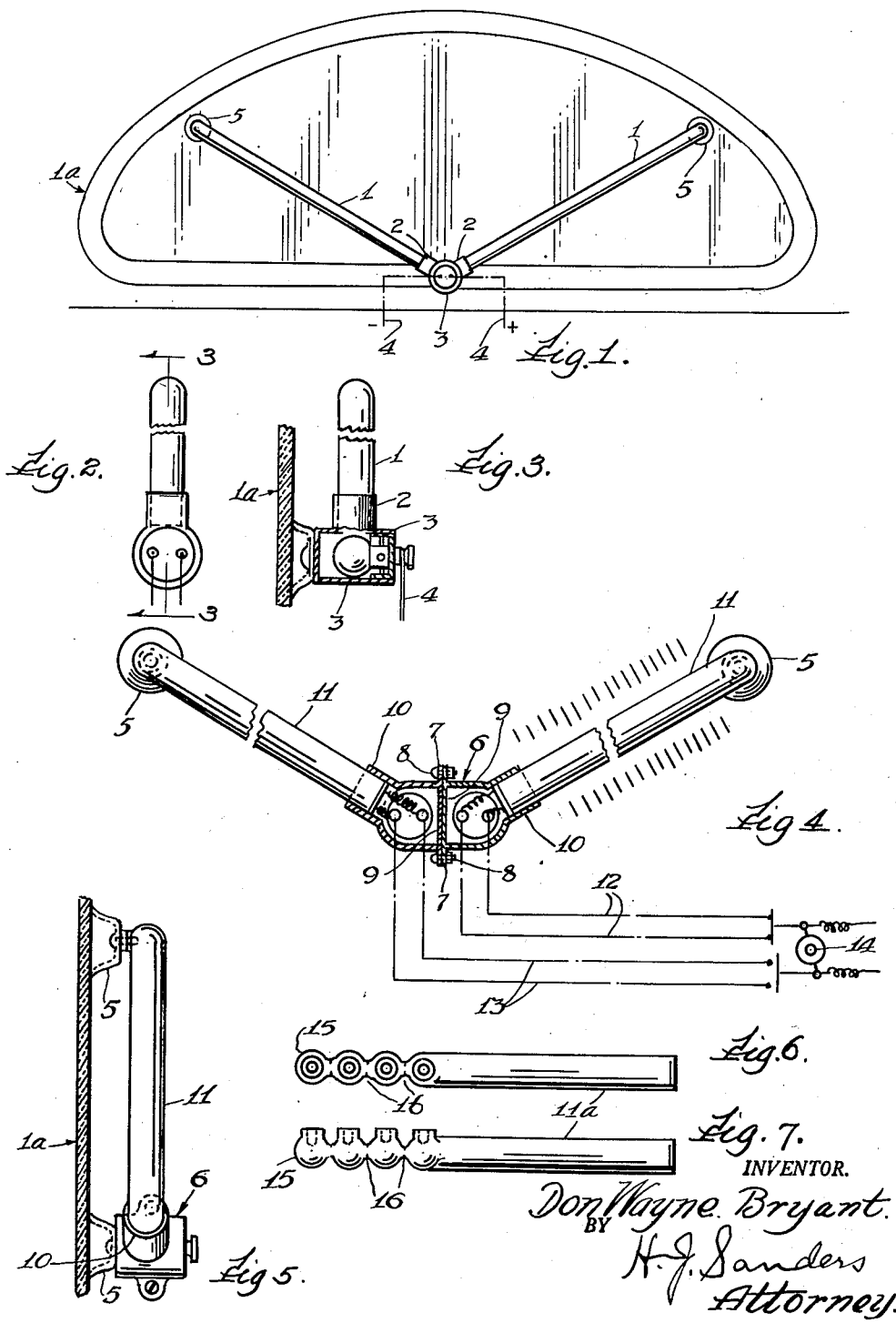

2,675,534

UNITED STATES PATENT OFFICE 2,675,534

REAR WINDOW SIGNALS FOR AUTOMOBILES

Don Wayne Bryant, Chicago, Ill., assignor of one-half to Sylvan M. Edison, Chicago, Ill.

Application November 6, 1952, Serial No. 318,987

3 Claims. (Cl. 340—97)

This invention relates to visual signals for vehicles and more particularly to what is generally known as stop and/or direction signals for automobiles. One object is to provide a visual signal for application desirably to the rear window of the car inside the same, the signal being instantly applicable to or removable from the window pane without marring the window, without appreciably blocking the view of those persons, particularly the driver, inside the car, the signal when in this position being clearly visible to persons such as drivers of other vehicles following at the rear, or about to pass, the car bearing the signal.

A further object is to provide a visual signal having no moving parts, one that may be adjusted to "fit" windows of different sizes easily, one that is easily operated by the driver without distracting his attention, one that is simple in structure, prominently clearly visible, inexpensive to manufacture and durable in use.

With the foregoing and other objects in view the invention consists in the combination and arrangement of parts to be hereinafter described, defined in the claims and illustrated in the accompanying drawing forming part of this disclosure and wherein:

Fig. 1 is a view of the instant signal, single light, inside the vehicle and applied to the rear window of same.

Fig. 2 is a view, partly broken away, of a modified form of the signal.

Fig. 3 is a vertical sectional view substantially on the line 3—3 of Fig. 2.

Fig. 4 is a view, partly in section, partly diagrammatic, of the signal of Fig. 1, partly energized, employing two lights.

Fig. 5 is a side elevational view of Fig. 4 shown applied to the vehicle rear window.

Fig. 6 is a detail plan view of a modified form of signal light tube that may be employed, and, Fig. 7 is a side elevational view of same.

The reference character 1a denotes the rear window of an automobile as seen from inside the car and to which the instant signal is to be secured as by rubber suction cups or the like, in the present preferred form, the points of attachment being three points widely separated. The signal as shown in Fig. 1 provides two elongated transparent tubular twin arms 1 each mounted in one of the branches 2 of a casing and single lamp socket 3, disposed immediately below and contiguous to the window pane and not in a position to obscure vision therethrough, the arm and socket assembly being such that they form a wide V, the socket provided with a conventional electric bulb which when energized provides light throughout the length of both arms 1, desirably red lights.

The bulb is connected by wires 4 to the electrical system within the car in such manner that applying the service brakes by the foot pedal will energize the lamp and illuminate the arms 1, 1. The lamp socket 3 and the outer terminals of the arms 1, 1 are each provided with a suction cup 5 by means of which the signal is releasably secured to the vehicle rear window, the arms 1 each having the word "stop" impressed therein so that when the arms are illuminated this word is clearly visible to drivers and others following or passing the car.

Referring now to Figs. 2 and 3 a single tubular arm 1 is carried in the single branch 2 of socket 3 secured by cup 5 to the window, the arm 1 being here vertically disposed and desirably secured to the window at substantially its longitudinal central portion at or near the base of the window.

Referring now to Figs. 4 and 5 a sectional lamp socket 6 is provided, the sections having flanges 7 which are secured together by rivets 8 or the like, the sections of the socket separated by inner partitions 9 forming lamp compartments, each section having a branch 10 carrying a neon gas tube 11 which tubes are connected by conductors 12 or 13 controlled by switch 14, manually operated, in such manner that the tubes may be selectively energized so that the word "right" is displayed by one tube and the word "left" by the opposite tube.

A modified form of light tube is shown in Figs. 6 and 7, these tubes 11a adapted to be carried by either of the said sockets, each tube 11a formed with separable instantly expendable extension 15 connected together by reduced portions 16, each extension having a socket to receive a suction cup. When it is desired to shorten a tube 11a to fit a small window one or more extensions are severed at 16 from the tube, this being possible by the means of an ordinary glass cutter.

What is claimed is:

1. In visual signals for vehicles having a rear window, tubes of transparent material arranged within the vehicle secured to said window, means for securing said tubes to each other in wide V-shape spanning said window, illuminating means for said tubes carried by said securing means, and instantly detachable means for securing said tubes to said window.

2. In visual signals for vehicles having a rear window, transparent tubes having instantly expendable portions arranged within the vehicle secured to said window, means for securing said tubes to each other in wide V-shape, illuminating means for said tubes, and suction cups carried by said expendable tube portions.

3. In visual signals for vehicles having a rear window, tubes of transparent material arranged within the vehicle secured to said window, means for securing said tubes to each other in wide V-shape spanning the window, said means disposed immediately below the window pane, illuminating means for said tubes, and suction cups at the free ends of said tubes securing same to the window pane.

References Cited in the file of this patent

UNITED STATES PATENTS

| Number | Name | Date |
|---|---|---|
| 1,629,425 | Wardbaugh | May 17, 1923 |
| 1,866,185 | Yarnell | July 5, 1932 |
| 2,084,252 | Hallenberg | June 15, 1937 |
| 2,219,203 | Townsend et al. | Oct. 22, 1940 |